United States Patent [19]
Bonk et al.

[11] 3,956,939
[45] May 18, 1976

[54] ROTARY-PISTON MEASURING DEVICE

[75] Inventors: Willi Bonk, Hamburg; Heinz Delin, Wedel, Holst, both of Germany

[73] Assignee: H. Maihak A.G., Hamburg, Germany

[22] Filed: Feb. 27, 1975

[21] Appl. No.: 553,665

[30] Foreign Application Priority Data
Mar. 1, 1974    Germany.............................. 2409825

[52] U.S. Cl.................................... 73/419; 73/4 D
[51] Int. Cl.²............................................ G01L 7/16
[58] Field of Search............................. 73/4 D, 419

[56] References Cited
UNITED STATES PATENTS
3,630,071   12/1971   Newnan................................ 73/4 D

*Primary Examiner*—Donald O. Woodiel
*Attorney, Agent, or Firm*—Michael J. Striker

[57] ABSTRACT

A cylinder has spaced ends and a piston is slidably and turnably received in this cylinder. An opening is provided through which a pressure fluid is admitted into the cylinder at one end, and an arrangement is provided which is connected with the piston so that counter-weights can act upon the piston in a sense opposite to the pressure exerted by the pressure fluid. The arrangement includes a ball and socket structure.

12 Claims, 2 Drawing Figures

ROTARY-PISTON MEASURING DEVICE

BACKGROUND OF THE INVENTION

The present invention relates generally to a pressure measuring device, and more particularly to a rotary-piston pressure measuring device.

Pressure measuring devices of this type are known in the art. They include a piston which is slidable in a cylinder at one end of which a pressure fluid is admitted. An arrangement is connected with the piston onto which weights of different magnitude may be placed so as to counteract the pressure exerted by the pressure fluid. The piston is also rotatable and is rotated during the measuring operation, in order to thereby overcome measuring errors resulting from static friction. The weights acting upon the piston are changed until a balance between the weights and the pressure exerted by the pressure fluid is reached, as indicated by the fact that an indicium provided on the piston maintains unchanged its position relative to the cylinder.

The conventional devices of this type have the disadvantage than when the piston is first caused to rotate by manual engagement with an appropriate member, radial forces develop; during the actual rotation imbalances develop because of tolerance variation in the centering flanges of the arrangement. These two factors may brake the rotation of the piston and thus allow a renewed influence of the static friction to be exerted upon the measured result. These influences may also cause damage to occur to the polished surfaces of the piston and cylinder which are in engagement with one another. Another disadvantage of the prior-art arrangements of this type is the fact that the counter balancing weights are arranged above the piston, so that tilting moments may act upon the piston which may lead to a distortion of the measured result and/or damage to the contacting surfaces of the piston and cylinder.

SUMMARY OF THE INVENTION

Accordingly, it is a general object of this invention to overcome the disadvantages of the prior art.

More particularly, it is an object of the present invention to provide a rotary-piston pressure measuring device of the type in question, which avoids the aforementioned disadvantages.

Another object of the invention is to provide such a pressure measuring device which makes possible very exact pressure measurements with a measuring error that is smaller than approximately 0.5% 0/00.

In keeping with these objects, and with others which will become apparent hereafter, one feature of the invention resides in a rotary-piston pressure measuring device which, briefly stated, comprises a cylinder having spaced ends, a piston slidably and turnably received in this cylinder, and means for admitting a pressure fluid into the cylinder and one of the ends. Weight means is provided, and connecting means is provided which includes a ball and a socket structure and connects the piston with the weight means for the latter to move with and act counter to the pressure exerted by the pressure fluid.

It is advantageous if the piston itself is hollow and if the ball and socket structure is located in its hollow interior.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
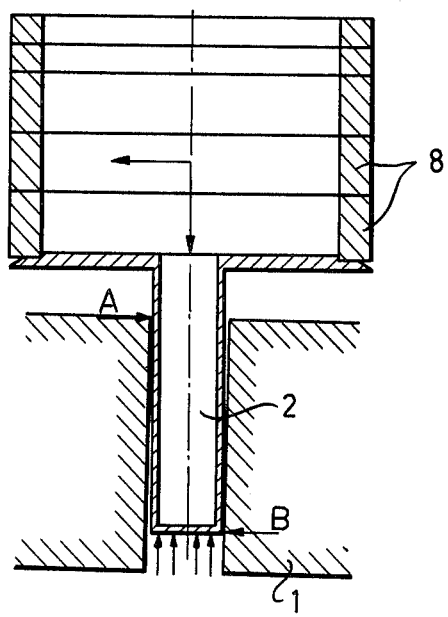
FIG. 1 is a fragmentary diagrammatic axial section through a rotary-piston pressure measuring device according to the prior art.

Discussing firstly the prior-art rotary-piston pressure measuring device illustrated in FIG. 1, it is pointed out that this has a cylinder 1 in which a piston 2 is slidable and is also turnable. The piston 2 has at its one end (the upper end in FIG. 1) a transversely extending support or plate on which weights 8 may be placed. Pressure fluid is admitted into the cylinder 1 from the end opposite the one at which the weights 8 are located, as indicated by the arrows. It tends to shift the piston 2 in the direction of the arrows, and this displacement is counteracted by the weights 8, of which additional ones are placed onto the supporting plate of the piston 2, or subtracted from those already resting on the supporting plate, until an equilibrium of forces is obtained and the piston 2 remains stationary in its position relative to the cylinder 1. To obtain an acceptable measuring accuracy, about 0.5 0/00, during the measuring and calibrating operation it is necessary that no metallic contact exist between the piston 2 and the cylinder 1. This is prevented by having an air film located between the outer circumferential surface of the piston 2 and at the inner circumferential surface of the cylinder 1. For this purpose the piston 2 is manually caused to rotate, by engaging weights 8 and placing them in rotation as indicated by the arrow associated with these weights.

When the rotation first begins, it has been observed that in addition to the tangential force there will also frequently develop radial forces with the disadvantages outlined earlier. Furthermore, due to tolerances in the centering flanges of the weights, by means of which the weights 8 are retained and centered on the supporting plate of the piston 2 and which are diagrammatically shown in FIG. 1, imbalances may result during the actual rotation. These forces may act to produce tilting moments which operate upon the piston 2, due to the fact that the weights 8 are arranged above the piston, so that the piston 2 can tilt and move skew in the cylinder 1. This may result in an interruption of the air film between the juxtaposed surfaces of the piston and cylinder, for example in the regions identified with reference characters A and B, leading to direct metallic contact and damage to the polished surfaces. This can cause the piston 1 to size in the cylinder 1 and lead to a complete falsification of the measuring results. These problems of the prior-art structure shown in FIG. 1 are overcome by the present invention, an embodiment of which is shown by example in FIG. 2.

Figure 2:
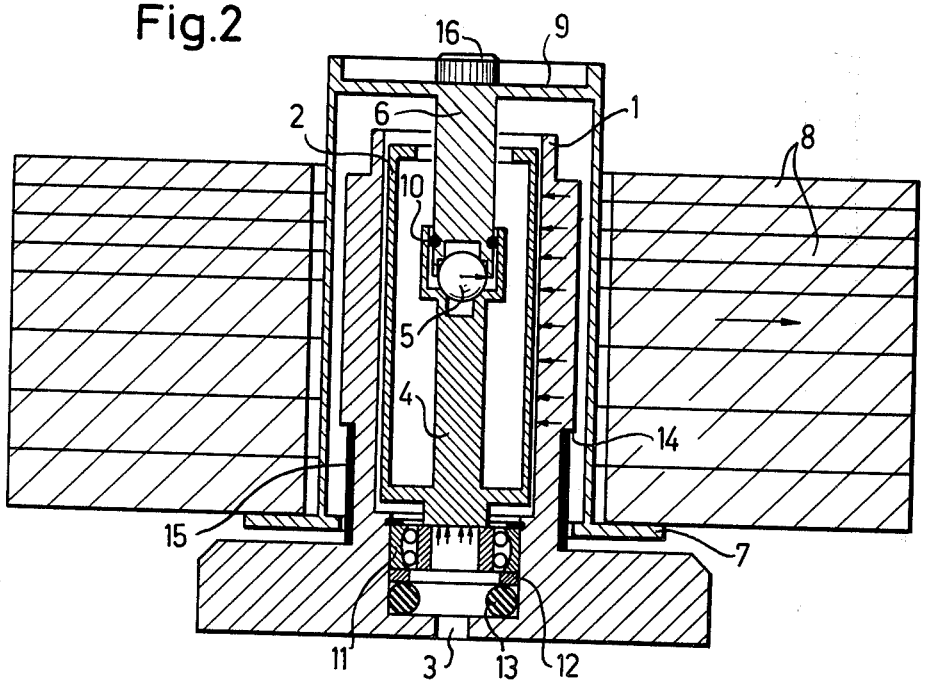
FIG. 2 is a diagrammatic axial section through a pressure measuring device according to the present invention.

The elements which in FIG. 2 are similar to those of FIG. 1 are identified with the same reference numerals, for ease of comparison and identification. Hence, reference numeral 1 again identifies the cylinder and reference numeral 2 the piston which in the illustrated embodiment is hollow. The cylinder 1 is provided with an opening 3 through which the pressure fluid is admitted from a non-illustrated source. Within the hollow interior of the piston 2 there extends axially (upwardly in FIG. 2) a center boss 4 which projects from the closed bottom end of the cylinder and whose upper end is formed with a depression in which a spherical member 5 is received. A weight-carrying sleeve is provided which is of generally bell-shaped configuration, i.e., which externally overlaps and surrounds the cylinder 1. It has downwardly projecting interior rod or ball pin 6 which also is provided with a recess in which the spherical member 5 is partially accommodated. The weights 8 are of annular configuration surrounding the sleeve 7 and resting on the bottom flange of the latter. The upper end of the sleeve 7 is provided with a depression 9 onto which smaller weights can be placed to obtain fine adjustments.

An O-ring 10 is located between the ball pin 6 and the boss 4. The lower delimitation for movement of the piston 2 is constituted by a self-aligning bearing 11 which loosely rests on a soft O-ring 13, a washer or ring 12 being interposed between them. The upper delimitation of the movement of the piston 2 is constituted by the sleeve 7 which has a portion of its bottom flange projecting radially inwardly to move into engagement with a shoulder 14 formed on the outer circumference of the cylinder 1.

When a measurement is to be taken with the device according to the present invention, it is the sleeve 7 which is made to rotate, and weights 8 are added or subtracted until the weights counterbalance the pressure of the pressure fluid admitted through the opening 3. If necessary, fine-measuring weights are placed into the recess 9. The rotary movement of the sleeve 7 is frictionally transmitted to the piston 2 via the ball pin 6, the spherical member 5 and the boss 4. When the sleeve is rotated fast enough, and when pressure fluid is admitted through the inlet opening 3, metallic static friction between piston 2 and cylinder 1 is reduced to a minimum.

It is clear that metallic friction between cylinder 1 and piston 2 as a result of radial forces and imbalances occurring during the rotation, is avoided. The reasons for this result are as follows:

In the first place, the present invention eliminates the disadvantageous location of the weights 8 above the piston, as was the case in prior art. The weights 8 are now so located that their center of gravity will act in the region of the lower half of the piston 2, depending upon the number of weights 8 that is placed onto the supporting flange of the sleeve 7. This significantly reduces any possibility that tilting moments can act upon the piston 2.

Furthermore, the previous rigid connection between the piston 7 and the weight-supporting plate of the prior art is eliminated in the construction according to the present invention, being replaced with a frictional connection between piston 2 and sleeve 7 via the interposed spherical member 5. This means that if radial forces and/or imbalances do develop, the sleeve 7 will now be able to perform a tumbling rotational movement. The piston 2 continues to be loaded over its entire length and no tilting moment can occur, as is diagrammatically identified by the reference characters A and B in FIG. 1. If the imbalances become too large, then the lower end of the sleeve 7 moves into engagement with the outer surface of the cylinder 1, which is advantageously provided with a protective coating. When a measurement is carried out without the use of weights 8, or with only a small amount of weight, the O-ring 10 constitutes a delimitation. The use of a self-aligning bearing 11 at the location illustrated, so that it serves as a lower abutment, has the advantage that no wear can develop and no tilting moment can be transmitted to the piston 2 from this bearing, which might serve to interrupt the lubricating air film between the piston and the cylinder. The soft O-ring 13 assures that in the event the air is too rapidly cut off from the cylinder 1, the piston will impact upon the bearing 11 relatively softly and will not become damaged. The cooperation of the upper delimitation of the piston movement and the spherical member 5 assures that no tilting moment can be transmitted to the piston 2 even in its upper end position. If any wear of material occurs, the worn-away particles will always be located outside the cylinder-piston system, and cannot occur or fall into the space between the cylinder and piston, thereby eliminating the possibility that the piston might sieze within the cylinder. Finally, the essentially bell-shaped configuration of the sleeve 7, which overlaps the cylinder 1, also completely or at least substantially eliminates the entry of dust or other contaminants into the system, thus preventing measuring errors resulting from the intrusion of such contaminants.

Although it is not absolutely necessary to provide this feature, a further improvement in the reliability and accuracy of the device according to the present invention will be achieved if the point at which the weights act upon the piston 2 will be located on the longitudinal center line of the piston, and preferably in the lower half of the piston as mentioned earlier. The sleeve 7 need, of course, not be of the illustrated substantially bell-shaped configuration, but this is advantageous for the reasons outlined above. The O-rings may be of synthetic or natural rubber or of synthetic plastic material, and the ring 12 is advantageously of a metallic material. The sleeve 7 may be provided with a serated engaging portion, for example in the wall portion projecting upwardly of and surrounding the recess 9, to facilitate its being placed manually into rotation. The device according to the present invention, as shown by way of example in FIG. 1, obtains the desired measuring accuracy of 0.5 0/00. Moreover, once the sleeve 7 with the weights have been placed manually into rotation, the period for which the rotation will continue due to inertia is long enough so that the measuring or calibrating step can be carried out with sufficient safety, that is the rotation of the sleeve 7 will not stop so quickly that this stoppage might occur while the measurement is still being undertaken so that the returning effects of static friction might disadvantageously influence the measuring result.

It will be understood that each of the elements described above, or two or more together, may also find a useful application in other types of constructions differing from the types described above.

While the invention has been illustrated and described as embodied in a rotary-piston pressure measuring device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

The outer surface of the cylinder 1 is advantageously provided with a protective coating. Suitable for this purpose is a synthetic material with a small coefficient of friction, for example polytetrafluoroethylene.

What is claimed as new and desired to be protected by Letters Patent is set forth in the appended claims:

1. A rotary-piston pressure measuring device, comprising a cylinder having spaced ends; a piston slidably and turnably received in said cylinder; means for admitting a pressure fluid into said cylinder at a lower one of said ends; weight means; and connecting means, including a ball and socket structure connecting said piston with said weight means for the latter to move with and act counter to the pressure exerted by said pressure fluid, said piston being hollow and formed with an axially extending internal projection, and said structure including a ball in contact with a free end of said projection.

2. A measuring device as defined in claim 1, wherein said weight means comprises a boss projecting toward said free end of said projection in axial alignment therewith and engaging said ball at a side opposite said free end.

3. A measuring device as defined in claim 2, wherein said free end is formed with a socket in which said ball is received; and further comprising an O-ring between said free end and said boss.

4. A rotary-piston measuring device, comprising an upright cylinder having spaced ends and an inner circumferential wall; a cylindrical piston slidably and turnably received in said cylinder and having an outer circumferential wall juxtaposed with said inner circumferential wall and defining therewith a clearance for a fluid film; means for admitting a pressure fluid into said cylinder at the lower one of said ends; weight means; and connecting means including a ball-and-socket structure connecting said piston with said weight means for the latter to move with and act counter to the pressure exerted by said pressure fluid.

5. A measuring device as defined in claim 4, wherein said weight means acts upon said piston on the longitudinal axis thereof.

6. A measuring device as defined in claim 4, wherein said connecting means connects said weight means with said piston on the axis of the latter and at an axial location which is closer to said lower end of said cylinder than to the other end of the same.

7. A measuring device as defined in claim 4, wherein said weight means comprises a sleeve telescoped over said cylinder.

8. A measuring device as defined in claim 4; further comprising a protective covering on an outer wall surface of said cylinder.

9. A measuring device as defined in claim 4, said weight means comprising a sleeve telescoped over said cylinder and provided with an engaging portion by means of which a user is able to effect rotation of said sleeve and piston.

10. A rotary-piston pressure measuring device, comprising a cylinder having spaced ends; a piston slidably and turnably received in said cylinder; means for admitting a pressure fluid into said cylinder at a lower one of said ends; weight means; connecting means, including a ball and socket structure connecting said piston with said weight means for the latter to move with and act counter to the pressure exerted by said pressure fluid; and means limiting the axial movement of said piston towards said lower end, including a self-aligning bearing, an O-ring and an intermediate ring between said bearing and said O-ring.

11. A measuring device as defined in claim 10, wherein said intermediate ring is of metallic material and said O-ring is of resiliently yielding material.

12. A rotary-piston pressure measuring device, comprising a cylinder having spaced ends; a piston slidably and turnably received in said cylinder; means for admitting a pressure fluid into said cylinder at a lower one of said ends; weight means; connecting means, including a ball and socket structure connecting said piston with said weight means for the latter to move with and act counter to the pressure exerted by said pressure fluid; and means for limiting axial movement of said piston away from said lower end, including a projection extending from the exterior of said cylinder, said weight means including a sleeve telescoped over said cylinder and having an open end facing said lower end and provided with a portion adapted to abut said projection.

* * * * *